United States Patent Office 3,523,968
Patented Aug. 11, 1970

3,523,968
PRODUCTION OF 6-CHLORO-3,4-DIMETHYL-PHENOL AND ESTERS THEREOF
Karoly Szabo, Syracuse, N.Y., assignor to Syracuse University Research Corporation, Syracuse, N.Y., a corporation of New York
No Drawing. Filed Sept. 30, 1966, Ser. No. 583,445
Int. Cl. C07c *125/06*
U.S. Cl. 260—479
15 Claims

ABSTRACT OF THE DISCLOSURE

A process for preparing 6-chloro-3,4-dimethylphenol by chlorinating an ester of 3,4-dimethylphenol and hydrolyzing the chlorinated product. More specifically, a process for preparing N-methyl-(6-chloro-3,4-dimethylphenyl)-carbamate by either (a) reacting 6-chloro-3,4-dimethylphenol with methylisocyanate or (b) chlorinating N-methyl-(3,4-dimethylphenyl)-carbamate.

---

The present invention relates to a novel process for the preparation of 6-chloro-3,4-dimethylphenol, with the concomitant production of no more than minor amounts of unwanted 2-chloro-3,4-dimethylphenol, and to a novel process for the production of N-methyl-(6-chloro-3,4-dimethylphenyl)-carbamate (disclosed in U.S. Pat. 3,131,215), which is an insecticide known as Banol, with the cocomitant production of no more than minor amounts of unwanted, inactive 2-chloro-isomer. The latter process is particularly unique in that it can be carried out in one step.

The conventional method for the production of N-methyl-(6-chloro-3,4-dimethylphenyl)-carbamate as described in said U.S. Pat. 3,131,215 is to react methyl isocyanate with 6-chloro-3,4-dimethylphenol. However, the preparation of this substituted phenol starting material in acceptable purity and yield by direct chlorination of 3,4-dimethylphenol is not feasible, because about an equal amount of 2-chloro-3,4-dimethylphenol is also formed that cannot be separated readily from the desired 6-chloro isomer. The carbamate prepared from the 2-chloro isomer is not an active insecticide, thus its presence in substantial proportions is not only undesirable but also uneconomical. This prior art process also has the disadvantage that the chlorinated dimethylphenol must be prepared first as an intermediate and the transformation to the carbamate must take place as a separate second step. Other methods available, such as the diazotization of the corresponding aminophenol, such as 3,4-dimethyl-6-aminophenol, are not satisfactory because of prohibitive costs.

It is, accordingly, an object of the present invention to provide an economical process for producing 6-chloro-3,4-dimethylphenol with the concomitant production of no more than minor amounts of the unwanted 2-chloro-isomer.

It is another important object of the invention to provide an economical process for producing the insecticide N-methyl-(6-chloro-3,4-dimethylphenyl)-carbamate with no more than minor amounts of the inactive 2-chloro-isomer.

It is a further important object of the invention to provide a unique and novel process for producing the insecticide N-methyl-(6-chloro - 3,4 - dimethylphenyl)-carbamate, in one step, having present no more than minor amounts of unwanted 2-chloro isomer, using as a starting material, N - methyl - (3,4 - dimethylphenyl)-carbamate.

Other objects of the invention will be apparent to those skilled in the art from reading the present description.

In accordance with the present invention new processes have been discovered which circumvent the difficulties of the prior art processes and permit the large scale production of N-methyl-(6-chloro-3,4-dimethylphenyl)-carbamate in relatively pure condition having no more than very minor amounts of unwanted 2-chloro isomer.

In accordance with a preferred important embodiment of the invention, N-methyl-(3,4-dimethylphenyl)-carbamate is used as starting material and is chlorinated by conventional means, such as by reaction with chlorine gas, sulfuryl chloride, etc., in the presence or absence of a solvent and catalyst. The resulting desired N-methyl-(6-chloro-3,4-dimethylphenyl)-carbamate is not only substantially free from unwanted 2-chloro isomer, but no final, separate reaction with methylisocyanate is required as in the prior art.

In accordance with the more general aspects of the process of the invention, an ester of 3,4-dimethylphenol is prepared by reaction with esterifying agent such as acetic anhydride, phosgene, methylisocyanate, organic acids, such as the carboxylic acids, etc., and other esterifying agents which will produce esters with a phenol. The ester is then chlorinated with the conventional chlorinating agents. In the case where the starting ester is N-methyl-(3,4-dimethylphenyl)-carbamate, i.e., the ester produced from methylisocyanate, no further reaction steps are required to produce the insecticide N-methyl-(6-chloro-3,4-dimethylphenyl)-carbamate, since it is obtained directly as a result of the chlorination treatment, having no more than minor amounts of 2-chloro isomer present.

When an ester other than the N-methyl carbamate is employed as the starting material, the desired N-methyl-6-chloro-3,4-dimethylphenyl)-carbamate is obtained after chlorination, without any intermediate isolation, by reaction with methylisocyanate after hydrolysis, such as hydrolysis with alkali. By either process, the product contains no more than minor amounts of unwanted 2-chloro isomer.

In accordance with one embodiment of the invention, the starting material is an o-alkanoyl-3,4-dimethyl phenol of the formula:

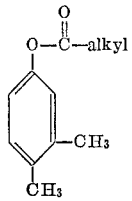

wherein alkyl is a straight or branched chain alkyl radical containing from about 1 to 5 carbon atoms, inclusive, such as methyl, ethyl, isopropyl and normal pentyl. These esters are usually obtainable in nearly theoretical yields.

The chlorination can be effected by common conventional chlorinating agents, such as chlorine gas, sulfuryl chloride, etc., in the presence or absence of a solvent and a catalyst.

If used, the solvents for the chlorination are preferably liquid under the reaction conditions. Specific examples of suitable solvents include chloroform, acetic acid, methylene chloride, benzene, chlorinated benzenes, pyridine, and the like.

Catalysts such as iodine, Lewis acids (e.g., $BF_3$, $FeCl_3$, $AlCl_3$, $SnCl_4$, $ZnCl_2$, etc.), a base, such as a basic amine, etc., may be used to further enhance the positional specificity of the chlorine substitution, however, excellent results can be assured even in the absence of such catalysts.

The chlorinated step can also be carried out in the presence of tertiary organic or inorganic bases used as HCl acceptors.

The temperature is desirably maintained below the decomposition temperature of the intermediate to be chlorinated, which decomposition temperature may be dependent on the presence and character of the catalyst used. Temperatures in the neighborhood of about minus 10 to plus 150° C., preferably 10 to 80° C., give rise to excellent yields of ester product.

In the process of the invention, the ratio of the desired 6-chloro compound compared to the inactive 2-chloro isomer is in the range of from 3:1 to 7:1, by molecular ratio.

In order more clearly to disclose the nature of the present invention, specific examples of the practice of the invention are hereinafter given. It should be understood, however, that this is done solely by way of example and is intended neither to delineate the scope of the invention nor limit the ambit of the appended claims. Unless otherwise stated, amounts are expressed in terms of parts by weight.

EXAMPLE 1

About 49.2 grams of 3,4-dimethylphenylacetate, 140 ml. of methylenechloride and 1 gram of aluminum chloride were placed in a three necked reaction flask equipped with a chlorine gas inlet tube, stirrer, thermometer, and reflux condenser. While the contents of the flask were vigorously stirred, 29 grams of chlorine were introduced into the reaction mixture. The temperature was maintained below 30° C. throughout the operation. When addition of the chlorine gas to the reaction mixture was completed, a cooling bath which had surrounded the reaction flask was removed and the reaction mixture was stirred at ambient temperature for about 15 minutes. The resulting reaction mixture was poured into 80 ml. water, shaken, separated from the water and stripped to yield an almost colorless oil of chlorinated ester in theoretical yield (60 g.). $N_D^{26}=1.5327$.

The resulting chlorinated product was hydrolyzed by refluxing with 200 ml. ethanol and 240 ml. 20% aqueous sodium hydroxide for six hours. The hydrolyzed mixture was poured into water, acidified with dilute hydrochloric acid, separated from the dilute hydrochloric acid and extracted with hexane three times (each time with 50 ml. of hexane). The combined hexane extract was treated with magnesium sulfate and charcoal, then filtered. Gas chromatographic analysis indicated that besides a negligible amount of unchlorinated 3,4-dimethylphenol, the molecular ratio of the chlorinated isomers is 78 to 22 in favor of the desired 6-chloro-3,4-dimethylphenol as compared to the undesired 2-chloro-isomer. The hexane solution was cooled to about −10° C. and inoculated with an authentic sample of 6-chloro-3,4-dimethylphenol. Crystallization took place in two hours. The hexane is decanted from the crystals, 80 ml. of ligroin were added and the mixture was vigorously stirred. The resulting solid 6-chloro-3,4-dimethylphenol was allowed to settle and the ligroin was decanted again. A sample of the resulting purified 6-chloro-3,4-dimethylphenol analyzed 93% pure.

100 ml. ligroin and 3 ml. chloroform were added to the solid 6-chloro-3,4-dimethylphenol, the resulting mixture was warmed until all solid was in solution, 14 grams of methylisocyanate and 1 ml. triethylamine were added and the mixture refluxed for 2 hrs. The mixture was cooled to 10° C., the tan solid product obtained, amounting to 43 grams of N-methyl-(6-chloro-3,4-dimethylphenyl)-carbamate was filtered, washed with ligroin and dried. It had a melting point of 121–128° C. Analysis of the product showed that it was in good agreement with the theoretical values.

EXAMPLE 2

About 49.2 gms. of 3,4-dimethylphenylacetate were chlorinated with chlorine gas without the presence of a solvent or catalyst at a temperature of below 40° C. The refractive index of the reaction mixture was intermittantly checked and chlorine introduction was stopped when the index at 24° C. was 1.5350 after aeration. The resulting chlorinated ester was hydrolyzed as in Example 1 above to give a substituted phenol mixture of 74.3% 6-isomer versus 25.7% 2-chloro isomer. The desired 6-chloro compound was fractionatedly crystallized as in Example 1 and the carbamate was obtained by reacting it without isolation with methylisocyanate. About 39 grams of N-methyl-(6-chloro - 3,4 - dimethylphenyl)-carbamate, having a melting point of 115–124° C., was obtained.

EXAMPLE 3

The following table shows yields of chlorinated 3,4-dimethylphenol obtained (6-chloro versus 2-chloro isomer ratio) in accordance with the process of the invention under different reaction conditions are shown in Table I below:

TABLE I

| Starting material | Solvent | Catalyst | Temp. (° C.) | Ratio of the 6-chloro versus 2-chloro isomers analyzed as phenols by gas chromatography |
|---|---|---|---|---|
| 3,4-dimethylphenylacetate | Methylene chloride | FeCl₃ | 35 | 82:12 |
| Do | Hexane | FeCl₃ | 25 | 78:26 |
| Do | Acetic acid | FeCl₃ | 30–32 | 74:27 |
| 3,4-dimethylphenylisobutyrate | Methylene chloride | FeCl₃ | 34 | 73:25 |
| 3,4-dimethylphenylacetate | Chloroform | I₂ | 30 | 75:25 |
| Do | Methylene chloride | AlCl₃ | 10 | 85:15 |
| Do | None | None | 75 | 74:26 |
| Do | do | BF₃ | 25 | 74:26 |
| 3,4-dimethylphenyl-pivalate | do | FeCl₃ | 35 | 83.5:16.5 |

EXAMPLE 4

About 18 grams of N-methyl-(3,4-dimethylphenyl)-carbamate and 2 grams of aluminum chloride were dissolved in 65 ml. of methylene chloride and placed in a flask equipped with reflux condenser, thermometer, stirrer and dropping funnel. A mixture of SO₂Cl₂ (25 grams) and S₂Cl₂ (2.5 grams) was gradually added to the agitated solution. Reaction started shortly with hydrogen chloride evolution while the temperature essentially remained the same without any regulation. When hydrogen chloride evolution slowed down, the mixture was heated to reflux for two hours. The reaction mixture was cooled, poured into water, washed with water, the organic layer separated, dried and the solvent evaporated to give a white solid waxy product. The product was taken up in acetone to form a turbid solution which was treated with charcoal and filtered to remove some elemental sulfur which had formed. When acetone was evaporated from the filtrate, the product crystallized. The melting point of the crude product was 88–110° C. After a hexane wash and drying, a sample of the washed and dried product melted at 108–124° C. After recrystallization from a solvent, the melting point was 116–125° C. The bulk of the crude product, which was obtained in theoretical yield was hydrolyzed to a phenol mixture, as in Example 1, and analyzed as such by gas chromatography. 85.1% 6-chloro isomer was found versus 14.9% of undesired 2-chloro-3,4-dimethylphenol.

EXAMPLE 5

The process of Example 4 was repeated using 1.6 grams of ferric chloride instead of 2 grams of aluminum chloride. This resulted in a product in theoretical yield which after hydrolysis analyzed as 82% 6-chloro-3,4-dimethylphenol versus 18% of the undesired 2-chloro isomer.

EXAMPLE 6

About 36 grams N-methyl-(3,4-dimethylphenyl)-carbamate and 1 gram of ferric chloride were dissolved in 150 ml. of methylene chloride and 16 grams of chlorine gas were introduced into the solution during agitation while the temperature was maintained at 25° C. with cooling means. When addition of the chlorine was completed the cooling means was removed and the mixture was stirred for another 15 minutes without change in temperature. The reaction mixture was poured into 200 ml. of water, the resulting mixture vigorously shaken and the organic phase was separated. The organic phase or solution was washed with a 5% aqueous sodium bicarbonate solution, separated again, and the organic solution dried over magnesium sulfate and stripped of solvent to yield a white solid in quantitative yield. A sample triturated with hexane melted at 111–125° C. The bulk of the crude product was hydrolyzed as in Example 1. The ratio of the 6-chloro isomer to the 2-chloro isomer was 80.5 to 19.5%.

EXAMPLE 7

About 18 grams of N-methyl-(3,4-dimethylphenyl)-carbamate, 8.5 grams of pyridine, and 0.2 gram of iodine were dissolved in 170 ml. methylene chloride. 9 grams of chlorine gas were introduced into the resulting mixture while the temperature was maintained below 34° C. with cooling means. The reaction mixture was poured into 400 ml. of 1% aqueous hydrochloric acid, shaken, and the organic phase separated. The organic phase was then washed twice with water and finally with a 5% aqueous sodium bicarbonate solution. After drying the organic phase over magnesium sulfate, the solvent was stripped to give a semisolid product. Half of the product was hydrolyzed in 40 ml. of 20% aqueous sodium hydroxide and 50 ml. methanol at reflux temperature. The ratio of the desired 6-chloro isomer was 83.7% compared to 16.3% of the 2-chloro isomer.

EXAMPLE 8

The process of Example 4 was repeated with the exception that aluminum chloride catalyst was omitted. In the resulting product, the ratio of the two ortho isomers was 80.8% to 19.2% in the favor of the desired 6-chloro isomer versus the undesired 2-chloro isomer.

EXAMPLE 9

The process of Example 7 was repeated but instead of pyridine, 2 grams of triethylamine were used. The weight ratio of the 6-chloro compound compared to the 2-chloro isomer was 4.5 to 1.

EXAMPLE 10

About 4.5 grams of N-methyl-(3,4-dimethylphenyl)-carbamate, 11 grams of sodium carbonate, 0.2 gram of iodine and 150 ml. of methylene chloride were placed in a reaction flask equipped with a reflux condenser, thermometer, chlorine inlet tube and stirrer and into the resulting reaction mixture 2 grams of chlorine gas were introduced while the mixture was vigorously agitated and cooled with a cooling means. The temperature rose to 32° C., then dropped to 28° C. The mixture was filtered, washed with water, the organic phase was separated, dried over solid magnesium sulfate and stripped of the methylene chloride solvent. The product obtained was hydrolyzed and analyzed by gas chromatography in the form of the phenol. The ratio of the 6-chloro compound to the 2-chloro isomer was 3 to 1.

EXAMPLE 11

Example 7 was repeated except that no iodine was used and 10.1 grams of triethylamine were employed in lieu of 8.5 grams of pyridine. In the product, the ratio of the 6-chloro isomer to the 2-chloro isomer was 87 to 13.

EXAMPLE 12

Example 4 was repeated using o-dichlorobenzene as solvent instead of an equal amount of methylene chloride. The product, N-methyl-(6-chloro-3,4-dimethyl-phenyl)-carbamate was 84% pure and was further purified to 95% purity by applying hexane trituration and washing.

As will be apparent to those skilled in the art, the foregoing examples may be modified, in accordance with the present invention, by employing other solvents, such as chloroform, benzene, cyclohexane, etc. with similar results. Similarly, other chlorinating agents, catalysts, etc. may be employed.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A process for preparing 6-chloro-3,4-dimethylphenol which comprises chlorinating an ester of 3,4-dimethylphenol and hydrolyzing the chlorinated product.

2. A process in accordance with claim 1 whereby the chlorination is accomplished by means of chlorine.

3. A process in accordance with claim 1 whereby the chlorination is accomplished by means of sulfuryl chloride.

4. A process in accordance with claim 1 whereby the chlorination is carried out in the presence of an inert solvent.

5. A process in accordance with claim 1 whereby the chlorination is carried out in the presence of a catalyst selected from the class consisting of iodine, a Lewis acid and a basic amine.

6. A process for preparing N-methyl-(6-chloro-3,4-dimethylphenyl)-carbamate which comprises chlorinating N-methyl-(3,4-dimethylphenyl)-carbamate.

7. A process in accordance with claim 6 whereby the chlorination is accomplished by means of chlorine.

8. A process in accordance with claim 6 whereby the chlorination is accomplished by means of sulfuryl chloride.

9. A process in accordance with claim 6 whereby the chlorination is carried out in the presence of an inert solvent.

10. A process in accordance with claim 6 whereby the chlorination is carried out in the presence of a catalyst selected from the class consisting of iodine, a Lewis acid and a basic amine.

11. A process of preparing N-methyl-(6-chloro-3,4-dimethylphenyl)-carbamate which comprises chlorinating an ester of 3,4-dimethylphenol, hydrolyzing the chlorinated product to 6-chloro-3,4-dimethylphenol and the reacting 6-chloro-3,4-dimethylphenol with methylisocyanate to yield the desired carbamate.

12. A process in accordance with claim 11 whereby the chlorination is accomplished by means of chlorine.

13. A process in accordance with claim 11 whereby the chlorination is accomplished by means of sulfuryl chloride.

14. A process in accordance with claim 11 whereby the chlorination is carried out in the presence of an inert solvent.

15. A process in accordance with claim 11 whereby the chlorination is carried out in the presence of a catalyst selected from the class consisting of iodine, a Lewis acid and a basic amine.

(References on following page)

References Cited

UNITED STATES PATENTS

| | | | |
|---|---|---|---|
| 2,452,154 | 10/1948 | Ross | 260—623 |
| 2,777,002 | 1/1957 | Sullivan | 260—623 |
| 3,131,215 | 4/1964 | Lemin | 260—479 |

OTHER REFERENCES

Morrison et al., "Organic Chemistry," Boston, Allyn & Bacon, 1959, (I) pp. 284–290, (II) p. 486.

Wepster (Klyne et al., eds.), Progress in Stereochemistry, vol. 2 (1958), Butterworths, London, pp. 107–111.

Gould Mechanisms and Structure in Org. Chem. (1959), Holt, Rinehart and Winston, New York, pp. 429–431. 436 and 437.

JAMES A. PATTEN, Primary Examiner

U.S. Cl. X.R.

260—623

PO-1050
(5/69)

UNITED STATES PATENT OFFICE
CERTIFICATE OF CORRECTION

Patent No. 3,523,968  Dated August 11, 1970

Inventor(s) Karoly Szabo

It is certified that error appears in the above-identified patent and that said Letters Patent are hereby corrected as shown below:

Column 1, line 30, the word "cocomitant" should be --concomitant--.

Column 2, line 70, the word "chlorinated" should be --chlorination--.

Columns 3 and 4, Table 1, correct the first four sets of figures in the right-hand column as follows:

change "82:12" to --82:18-- change "78:26" to --78:22-- change "74:27" to --74:26-- change "73:25" to --73:27--.

SIGNED AND
SEALED
OCT 20 1970

(SEAL)
Attest:

Edward M. Fletcher, Jr.       WILLIAM E. SCHUYLER, JR.
Attesting Officer      Commissioner of Patents